(12) United States Patent
Jackson

(10) Patent No.: US 11,095,548 B1
(45) Date of Patent: Aug. 17, 2021

(54) METHODS, SYSTEMS, AND COMPUTER READABLE MEDIA FOR TESTING SOFTWARE DEFINED NETWORKS

(71) Applicant: Keysight Technologies, Inc., Santa Rosa, CA (US)

(72) Inventor: Stephen Samuel Jackson, Chapel Hill, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/518,552

(22) Filed: Jul. 22, 2019

(51) Int. Cl.
*H04L 12/26* (2006.01)
*H04L 12/24* (2006.01)

(52) U.S. Cl.
CPC ............ *H04L 43/50* (2013.01); *H04L 41/145* (2013.01); *H04L 43/14* (2013.01); *H04L 43/16* (2013.01)

(58) Field of Classification Search
CPC ......... H04L 43/14; H04L 43/16; H04L 43/50; H04L 41/145
USPC ........................................................ 709/224
See application file for complete search history.

(56) References Cited

U.S. PATENT DOCUMENTS

| | | | |
|---|---|---|---|
| 9,007,922 B1 | 4/2015 | Mittal et al. | |
| 9,276,877 B1* | 3/2016 | Chua | H04L 45/38 |
| 2006/0007901 A1* | 1/2006 | Roskowski | H04W 24/00 370/338 |
| 2008/0198754 A1* | 8/2008 | Savoor | H04L 43/50 370/245 |
| 2010/0061721 A1* | 3/2010 | Kotrla | H04L 43/16 398/9 |
| 2012/0278485 A1 | 11/2012 | Qian et al. | |
| 2013/0064095 A1* | 3/2013 | Chew | H04L 43/50 370/241 |
| 2016/0037366 A1* | 2/2016 | Finkelstein | H04L 43/04 370/252 |
| 2019/0036780 A1 | 1/2019 | Evans et al. | |

* cited by examiner

*Primary Examiner* — Aftab N. Khan
*Assistant Examiner* — Patrick F Ngankam

(57) ABSTRACT

Methods, systems, and computer readable media for testing software defined networks (SDNs). An example system includes a traffic generator configured for generating SDN test traffic for the SDN; a network impairment module configured for applying a plurality of impairment profiles to the SDN test traffic; and a network testing monitor configured for monitoring the SDN test traffic on the SDN. The system includes an SDN performance modeler configured for mapping, for each impairment profile, the impairment profile to SDN performance metric values based on monitoring the SDN test traffic by the network testing monitor in response to applying the impairment profile by the network impairment module.

17 Claims, 4 Drawing Sheets

US 11,095,548 B1

METHODS, SYSTEMS, AND COMPUTER READABLE MEDIA FOR TESTING SOFTWARE DEFINED NETWORKS

TECHNICAL FIELD

The subject matter described herein relates to testing software defined networks (SDNs). More particularly, the subject matter described herein relates to methods, systems, and computer readable media for testing SDNs and mapping network impairments to SDN performance metrics.

BACKGROUND

Data communications networks carry a variety of data communicated using a variety of network devices including servers, routers, hubs, switches, and other devices. Before placing a network into use, the network, including the network devices carrying network traffic, may be tested to ensure successful operation. Network devices may be tested, for example, to ensure that they function as intended, comply with supported protocols, and can withstand anticipated traffic demands.

To assist with the construction, installation and maintenance of networks and network devices, networks may be augmented with network testing systems. The network testing systems may allow for the capturing, analyzing and/or sending of network communications. Testing a software defined network (SDN), however, may be especially challenging due to the ability of the network to change rapidly.

Accordingly, in light of these difficulties there exists a need for improved methods, systems, and computer readable media for testing SDNs.

SUMMARY

The subject matter described herein includes methods, systems, and computer readable media for testing software defined networks (SDNs). An example system includes a traffic generator configured for generating SDN test traffic for the SDN; a network impairment module configured for applying a plurality of impairment profiles to the SDN test traffic; and a network testing monitor configured for monitoring the SDN test traffic on the SDN. The system includes an SDN performance modeler configured for mapping, for each impairment profile, the impairment profile to SDN performance metric values based on monitoring the SDN test traffic by the network testing monitor in response to applying the impairment profile by the network impairment module.

In some examples, the SDN performance modeler is configured for training a machine-learning model based on mapping the impairment profiles to SDN performance metric values.

In some examples, the SDN performance modeler is configured for systematically causing the network impairment module to apply the impairment profiles in response to monitoring the SDN test traffic by increasing a value of an impairment parameter until a threshold level of network performance degradation is reached. In some other examples, the SDN performance modeler is configured for systematically causing the network impairment module to apply the impairment profiles in response to monitoring the SDN test traffic by increasing a value of an impairment parameter until a threshold rate of network performance degradation is reached.

In some examples, the system includes an SDN controller emulator configured for adjusting one or more control plane setting values for the SDN. The SDN performance modeler can be configured for mapping, for each adjustment of a plurality of adjustment profiles for the SDN controller emulator, the adjustment profile to one or more SDN performance metric values based on monitoring the SDN test traffic by the network testing monitor in response to applying the adjustment profile by the SDN controller emulator.

In some examples, the traffic generator is configured for generating both user plane test traffic and control plane test traffic for the SDN. The network impairment module can be configured for applying the impairment profiles to the control plane test traffic or the user plane test traffic or both.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

The subject matter described herein relates to methods, systems, and computer readable media for testing SDNs and mapping network impairments to SDN performance metrics. In particular, this specification describes a performance modeling system for SDNs such as software defined wide area networks (SD-WANs) that can be configured for training a machine learning model (e.g., neural net, genetic algorithm, and the like). The machine learning model can be configured to predict SDWAN performance in response to various network impairments, e.g., control signaling impairment scenarios.

Figure 1:
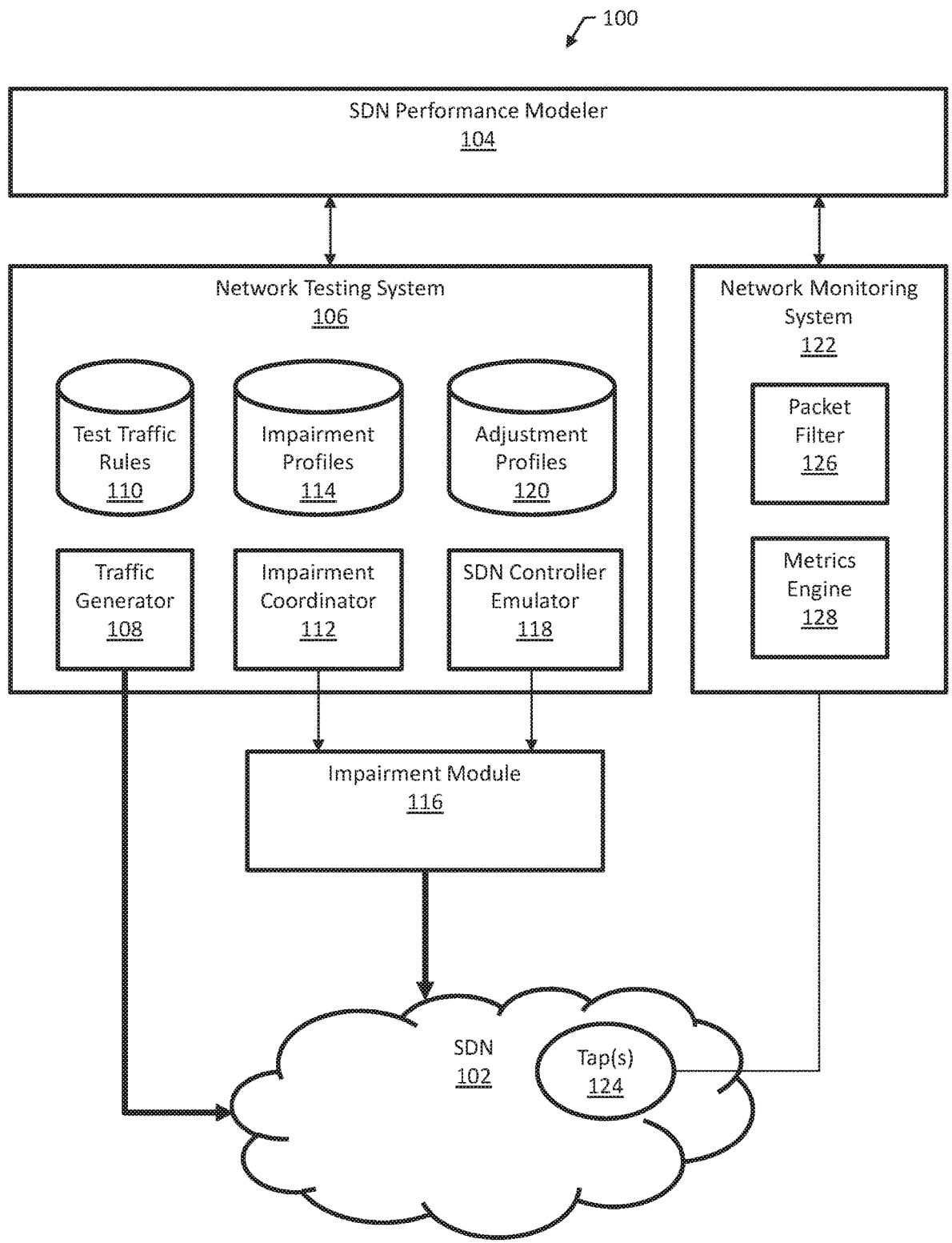
FIG. 1 illustrates an example network testing environment for testing a software defined network (SDN)

FIG. 1 illustrates an example network testing environment 100 for testing a software defined network (SDN) 102. In general, SDN 102 comprises a number of network devices implementing a data communications network. The network devices are configured according to an SDN architecture that decouples network control and forwarding functions. At least some of the network devices are programmable, enabling network control to be programmable by one or more SDN controllers. The underlying infrastructure can be abstracted from applications and network services.

In some examples, SDN 102 is a software defined wide area network (SD-WAN). For instance, SDN 102 can be a WAN that is implemented using lower-cost and commercially available Internet access. SD-WAN technology can allow businesses and other organizations to replace private WAN connection technologies. Due to the flexibility of SD-WAN networking devices, however, network operators may have difficulty in understanding how network issues will affect network performance. Network operators may have difficulty, for example, predicting or verifying that a SD-WAN is providing a contracted quality of service.

Network environment 100 includes an SDN performance modeler 104. SDN performance modeler 104 is configured for testing SDNs and mapping network impairments to SDN performance metrics. SDN performance modeler 104 can be useful, e.g., to enable network operators to test and verify various performance aspects of SDNs. For example, SDN performance modeler 104 can be used to verify that a SD-WAN is providing a contracted quality of service under a range of anticipated network scenarios. SDN performance modeler 104 can be implemented on a computer system, e.g., a server implemented using one or more processors and memory storing executable instructions for the processors.

Network environment 100 includes a network testing system 106. Network testing system 106 is configured for executing various network tests by executing test scripts, comparing results of test scripts with expected results, and producing test reports. In some examples, network testing system 106 includes a graphical user interface (GUI), and network operators can configure network testing system 106 using the GUI and view test reports using the GUI.

Network testing system 106 includes a traffic generator 108 configured for generating SDN test traffic for SDN 102. Traffic generator 108 can generate the SDN test traffic according to test traffic rules 110, which can be configured by, e.g., a network operator. Test traffic rules 110 can include flow rules or policy rules or both. Traffic generator 108 can generate user plane test traffic, control plane test traffic, or both.

Network testing system 106 includes an impairment coordinator 112 configured for using impairment profiles 114 to cause an impairment module 116 to apply impairment profiles to the SDN test traffic. Impairment module 116 artificially impairs the SDN test traffic to simulate network conditions in SDN 102. In some examples, impairment module 116 is a stand-alone computer system separate from network testing system 106 and connected to an output of network testing system 106; in some other examples, impairment module 116 is integrated with network testing system 106.

Impairment module 116 can impair the SDN test traffic using any appropriate type of impairment technique. For example, impairment module 116 can be configured to impair the SDN test traffic by delaying packets at a fixed rate specified in an impairment profile. In another example, impairment module 116 can be configured to impair the SDN test traffic by delaying packets at a variable rate specified in an impairment profile. In another example, an impairment profile can specify a packet delays that are both fixed and variable.

Similarly, impairment module 116 can be configured to impair the SDN test traffic by dropping packets at a fixed rate or a variable rate or both. Impairment module 116 can be configured to reorder packets as specified by an impairment profile. Impairment module 116 can be configured to cause asymmetric routing of packets.

In general, an impairment profile specifies one or more types of impairments and any parameter values for the impairments. Network testing system 106 can simulate a specific type of network issue by simultaneously applying one or more impairments as specified in an impairment profile, and network testing system 106 can simulate a sequence of network issues by applying a sequence of impairment profiles.

Network testing system 106 includes an SDN controller emulator 118. SDN controller emulator 118 is configured to temporarily replace one or more SDN controllers in SDN 102 for the purpose of manipulating SDN control settings in SDN 102. SDN controller emulator 118 can be configured to generate various SDN control plane signaling messages, and the content of the SDN control plane signaling messages can be selectively varied to characterize the performance of SDN 102 under various circumstances.

SDN controller emulator 118 is configured for adjusting one or more control plane setting values for SDN 102. For example, SDN controller emulator 118 can be configured applying adjustment profiles 120 to the SDN traffic when traffic generator 108 generates SDN control plane traffic by adjusting the control plane traffic at traffic generator 108 or after the control plane traffic leaves traffic generator 108, e.g., at impairment module 116. In general, SDN controller emulator 118 applies adjustment profiles that can potentially alleviate network issues arising by applied impairment profiles.

For example, SDN controller emulator 118 can change the packet rate or the packet size or both for one or more network devices of SDN 102. SDN controller emulator 118 can configure one or more network devices to activate a forward error-correcting process. SDN controller emulator 118 can re-route services between one or more network devices. SDN controller emulator 118 can configure one or more network devices to change or automate reporting responses to potential network issues.

Network environment 100 includes a network monitoring system 122. Network monitoring system 122 is configured for monitoring the SDN traffic on SDN 102. For example, network monitoring system 122 can be in communication with one or more taps 124 in SDN 102 to capture the SDN traffic. In some examples, network monitoring system 122 includes a graphical user interface (GUI), and network operators can configure network monitoring system 122 using the GUI and view test reports using the GUI. In some examples, network monitoring system 122 is a stand-alone computer system; in some other examples, network monitoring system 122 is integrated with network testing system 106.

Network monitoring system 122 includes a packet filter 126. For example, packet filter 126 can be configured to filter control plane packets from user plane packets on SDN 102. Filtering control plane packets can be useful, e.g., in performing network tests that involve impairing SDN control plane traffic.

Network monitoring system 122 includes a metrics engine 128. Metrics engine 128 is configured for generating SDN performance metric values based on monitoring the SDN traffic. For example, metrics engine 128 can determine values for packet loss, bit rate, throughput, transmission delay, availability, and the like. Metrics engine 128 can determine any appropriate type of performance metric value for control plane traffic or user plane traffic or both.

In some examples, metrics engine 128 determines different metrics depending on tests being applied by network testing system 106. For instance, SDN performance modeler 104 can specify both network testing scripts to network testing system 106 and network monitoring system 122. In some examples, a first set of metrics specify an actual throughput value or a predicted throughput value with respect to the actual throughput value. Then, follow-up metrics can include latency (predicted with respect to actual), and the other optional metrics (e.g., fragmentation, duplication, reordered, out-of-window, and link oversubscription).

SDN performance modeler 104 is configured for mapping impairment profiles and/or adjustment profiles to SDN performance metric values. For example, SDN performance modeler 104 can control network testing system 106 to generate test traffic and apply impairment profiles and then receive SDN performance metric values from network monitoring system 122. In some examples, SDN performance modeler 104 includes a GUI to present SDN performance metrics values or graphical displays representing SDN performance metrics values to network operators. For instance, the GUI can be used to present test results from network testing system 106 and graphics representing the mapping produced by SDN performance modeler 104, e.g., as graphs plotting the SDN performance metrics values over time in relation to impairment profiles and/or adjustment profiles.

In some examples, SDN performance modeler 104 is configured for training a machine-learning model based on mapping impairment profiles to SDN performance metric values. In some examples, SDN performance modeler 104 is configured for systematically applying impairment profiles in response to monitoring the SDN test traffic. Systematically applying the impairment profiles can include increasing a value of an impairment parameter until a threshold level of network performance degradation is reached or until a threshold rate of network performance degradation is reached.

Figure 2:
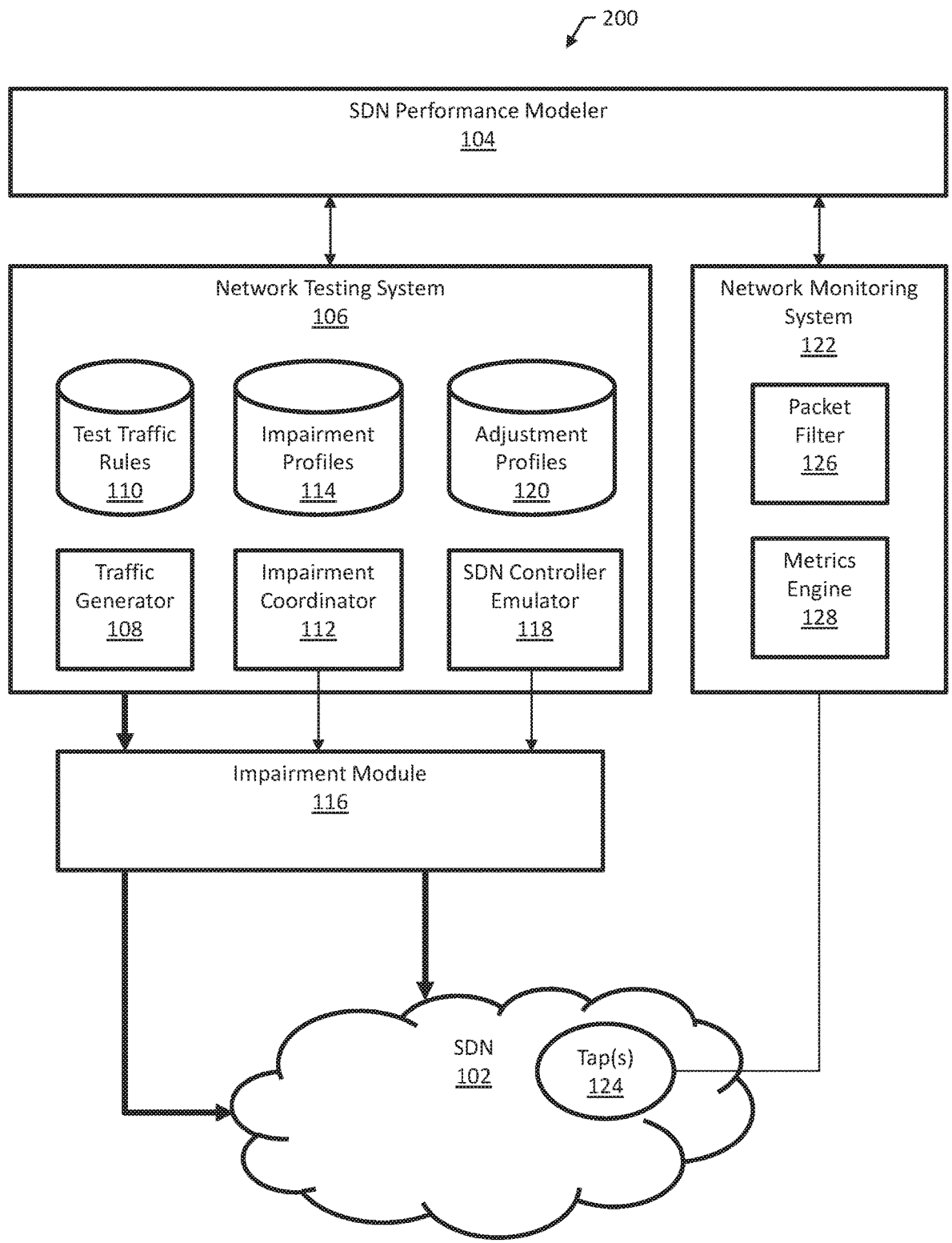
FIG. 2 shows an alternative configuration of the network testing environment.

As shown in FIG. 1, impairment module 116 is configured to impair control plane traffic generated by SDN controller emulator 118. FIG. 2 shows an alternative network testing environment 200 where impairment module 116 is configured to impair both control plane traffic generated by SDN controller emulator 118 and user plane traffic generated by traffic generator 108.

Figure 3:
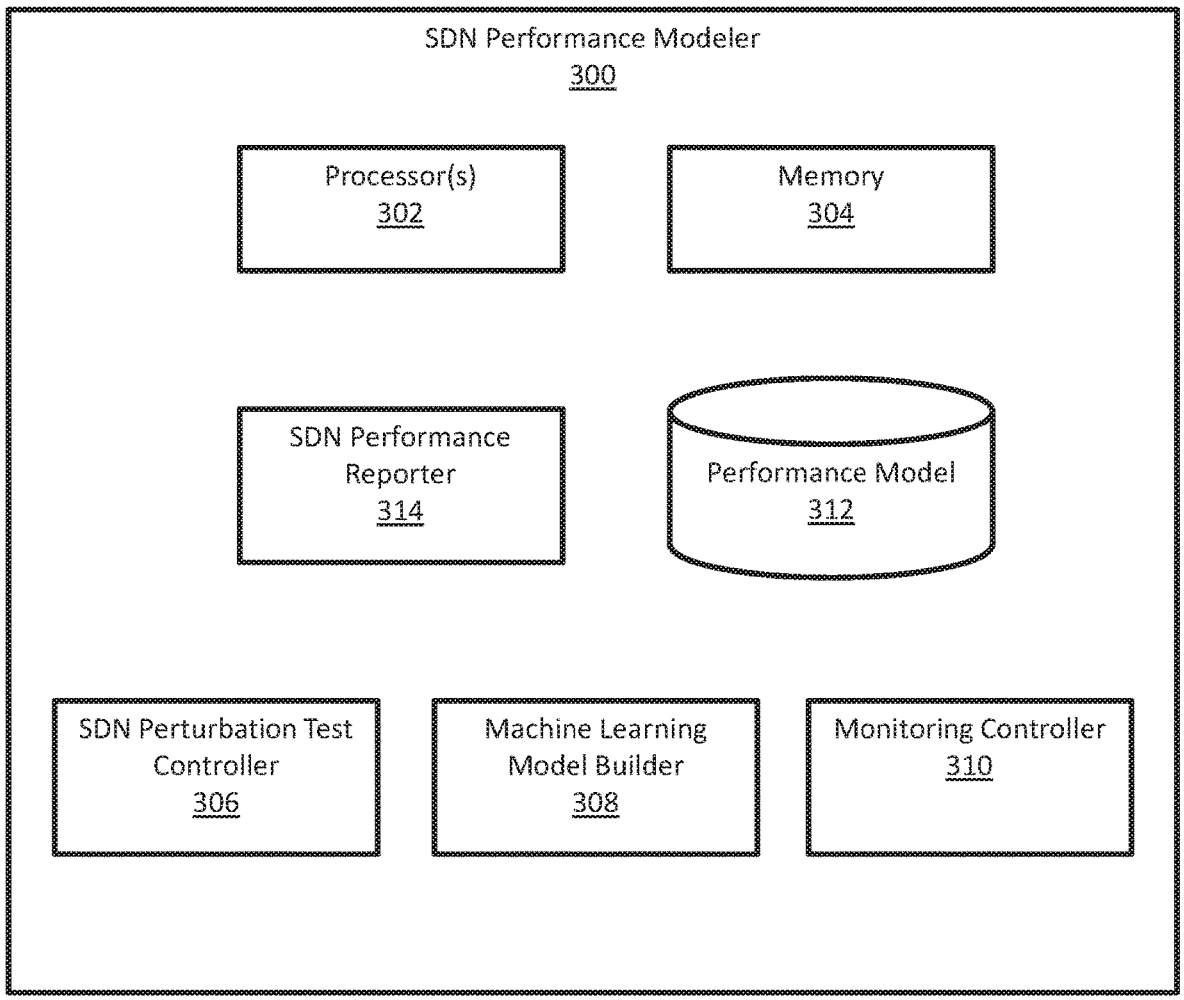
FIG. 3 is a block diagram of an example SDN performance modeler.

FIG. 3 is block diagram of an example SDN performance modeler 300. SDN performance modeler 300 is implemented on one or more processors 302 and memory 304 storing executable instructions for the processors 302.

SDN performance modeler 300 includes an SDN perturbation test controller 306, a machine-learning model builder 308, and a monitoring controller 310. SDN performance modeler 300 can include a performance model 312, e.g., a machine-learning model of an SDN under test created by machine-learning model builder 308. Machine-learning model builder 308 can build, e.g., a neural network or a genetic algorithm or an appropriate type of machine-learning model.

SDN performance modeler 300 can include an SDN performance reporter 314 configured to output SDN performance metrics and other appropriate data. For example, SDN performance reporter 314 can be implemented as a graphical user interface. SDN performance reporter 314 can produce graphical displays such as charts plotting SDN performance metrics.

SDN perturbation test controller 306 is configured for systematically applying impairment profiles in response to monitoring the SDN test traffic. Systematically applying the impairment profiles can include increasing a value of an impairment parameter until a threshold level of network performance degradation is reached or until a threshold rate of network performance degradation is reached.

SDN perturbation test controller 306 can vary the application of impairment profiles or impairment parameters of impairment profiles in a variety of different ways. In some examples, SDN perturbation test controller 306 systematically initiates a series of test runs, where each test run includes test traffic of a predetermined profile (e.g., a predetermined mix of traffic transmitted at a predetermine rate). For each test run, an impairment profile and/or an adjustment profile is selected. Based on the resulting SDN performance metrics, a further test run is made with a different impairment profile and/or adjustment profile.

Performance model 312 can be used to predict the performance of an SDN under various operating conditions. For example, typically SDN provisioning is robust enough to withstand an initial and solitary type and amplitude of impairment without necessarily exhibiting obvious performance compromise. The described predictive element is exemplified when a secondary type of impairment is added, chosen by performance model 312 based on the initial impairment type and amplitude.

Performance model 312 can be used to troubleshoot and diagnose operational problems under live conditions. For example, if an SDN begins experiencing problems, performance metrics can be collected from the SDN and fed as inputs to performance model 312. The described diagnostic element is exemplified when the performance model 312 reacts to the observed problem. In one preferred embodiment the performance model 312 would also provide a log, API, or other reporting technique, showing the automated reaction. SDN performance modeler 300 can output one or more anomalistic SDN control plan signaling impairment conditions that are consistent with the performance metrics, i.e., that could be responsible for an observed degradation of SDN performance.

In some examples, SDN perturbation test controller 306 is configured for modelling an SDN by ascertaining an asymptotic response from the system using an iterative analysis. In general, ascertaining an asymptotic response includes increasingly impairing the SDN until a performance metric that changes in response to the impairment stops deteriorating in a predetermined manner that fits a response profile.

For example, SDN perturbation test controller 306 can iteratively increase in the amplitude of an impairment until the corresponding observed anomaly stops deteriorating linearly. SDN perturbation test controller 306, at each iteration, increases the amplitude of the impairment; records a resulting value for the performance metric; and then determines whether a series of values for the performance metric shows a linear deterioration or not. When the series of values stops showing a linear deterioration, SDN perturbation test controller 306 records the amplitude of the impairment as a key value for performance model 312. Performance model 312 can then reflect the first level at which the impairment caused an artifact and also the level where it stopped getting worse.

For instance, consider the following example. Suppose that SND perturbation test controller 306 selects picks a Layer 5 or Layer 6 attribute to observe, and then associates a first and then one or more additional impairments to arrive at these 'knee' measurements. For example, a 8% packet drop with a Gaussian distribution with a 0.3 standard deviation might affect a video stream such that I-frames need to be sent 2 or 3 times the normal rate. The L3 protocol may govern this, in some cases.

That resend-effect might start at, e.g., 8% and does not get any worse up until, e.g., a 20% drop (same standard deviation) at which point the overall link fails for other reasons. Typical SDNs will not tolerate that much drop. Instead, SDN perturbation test controller 306 can leave the 8% drop in place then add, e.g., fixed delay. Up to a point, this added delay does not cause significant deterioration in the SDN (e.g., no deterioration or linear deterioration), until the lower layer protocol starts to not be able to keep track of the acks for the I-frame resend requests. At the point, the deterioration increases significantly, e.g., the rate of deterioration increases or changes from deteriorating linearly to deteriorating more rapidly. SDN perturbation test controller 306 records the point at which the added delay causes this change as a key value for performance model 312. For example, SDN perturbation test controller 306 can record the combination of the 8% loss impairment and the fixed delay point, associated together, which may be especially valuable to performance model 312 if neither of these conditions alone would trigger an SDN orchestration layer to intervene.

Figure 4:
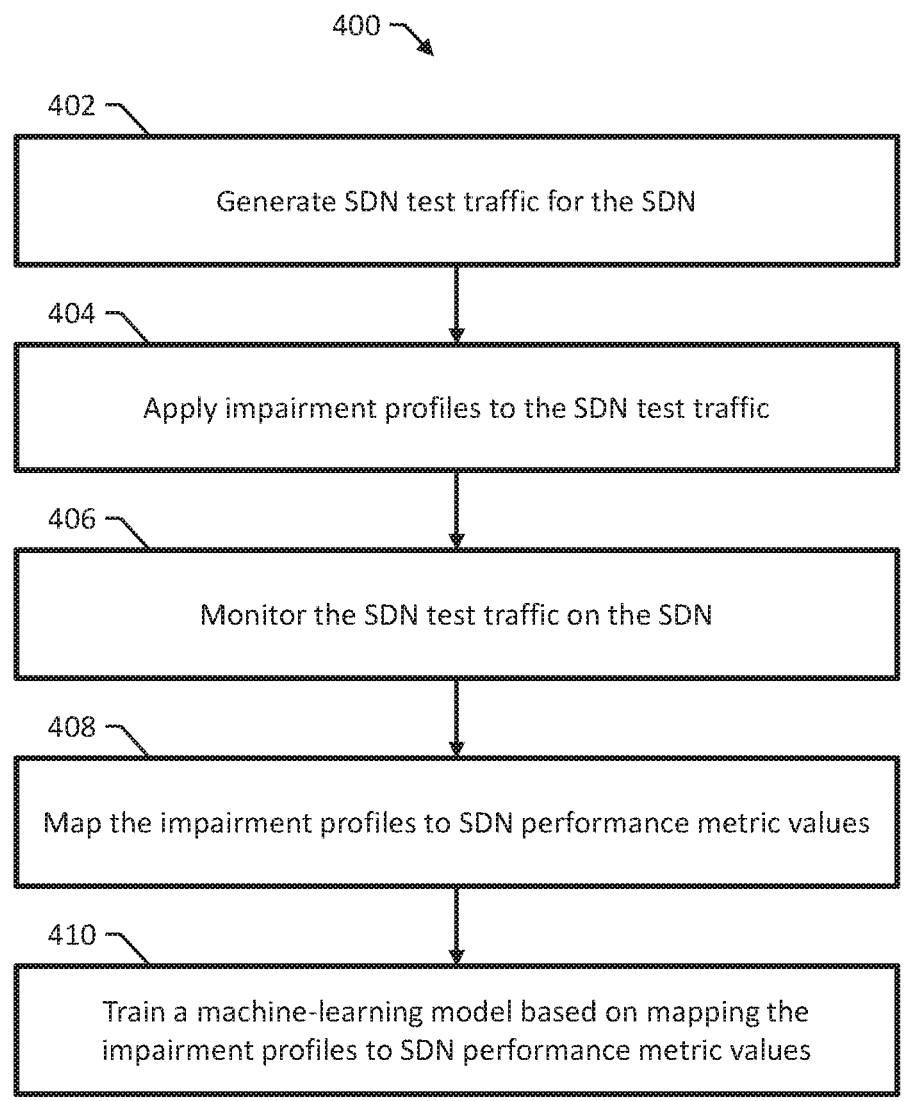
FIG. 4 is a flow chart of an example method for testing SDNs and mapping network impairments to SDN performance metrics.

FIG. 4 is a flow chart of an example method 400 for testing SDNs and mapping network impairments to SDN performance metrics. Method 400 can be performed, for example, by the SDN performance modeler 104 of FIG. 1.

Method 400 includes generating SDN test traffic for an SDN (402). For example, the traffic generator 104 of FIG. 1 can be used to generate the SDN test traffic. Generating test traffic can include generating user plane test traffic, control plane test traffic, or both.

Method 400 includes applying impairment profiles to the SDN test traffic (404). Method 400 includes monitoring the SDN test traffic on the SDN (406). For example, method 400 can include systematically applying the impairment profiles in response to monitoring the SDN test traffic. Systematically applying the impairment profiles can include increasing a value of an impairment parameter until a threshold level of network performance degradation is reached or until a threshold rate of network performance degradation is reached.

Method 400 includes mapping, for each impairment profile, the impairment profile to one or more SDN performance metric values based on monitoring the SDN test traffic in response to applying the impairment profile (408). Method 400 can optionally include training a machine-learning model based on mapping the impairment profiles to SDN performance metric values (410).

In some examples, method 400 includes adjusting one or more control plane setting values for the SDN. Method 400 then includes mapping, for each adjustment profile, the adjustment profile to one or more SDN performance metric values based on monitoring the SDN test traffic in response to applying the adjustment profile. For example, the SDN controller emulator of FIG. 1 can apply the adjustment profiles. Method 400 can then optionally include training the machine-learning model based on both mapping the impairment profiles to SDN performance metric values and on mapping the adjustment profiles to SDN performance metric values.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for testing a software defined network (SDN), the system comprising:
    a traffic generator, implemented using at least one first processor, configured for generating SDN test traffic for the SDN;
    a network impairment module configured for applying a plurality of impairment profiles to the SDN test traffic;
    a network testing monitor, implemented using at least one second processor, configured for monitoring the SDN test traffic on the SDN; and
    an SDN performance modeler configured for mapping, for each impairment profile of the plurality of impairment profiles, the impairment profile to one or more SDN performance metric values based on monitoring the SDN test traffic by the network testing monitor in response to applying the impairment profile by the network impairment module, wherein the SDN performance modeler is configured for systematically causing the network impairment module to apply the impairment profiles in response to monitoring the SDN test traffic by increasing a value of an impairment parameter until determining a threshold of network performance is reached by monitoring the SDN test traffic on the SDN; and
    an SDN controller emulator configured for adjusting one or more control plane setting values for the SDN, wherein the SDN performance modeler is configured for mapping, for each adjustment of a plurality of adjustment profiles for the SDN controller emulator, the adjustment profile to one or more SDN performance metric values based on monitoring the SDN test traffic by the network testing monitor in response to applying the adjustment profile by the SDN controller emulator.

2. The system of claim 1, wherein the SDN performance modeler is configured for training a machine-learning model based on mapping the impairment profiles to SDN performance metric values.

3. The system of claim 1, wherein increasing a value of an impairment parameter until a threshold of network performance is reached comprises increasing the value of the impairment parameter until a threshold level of network performance degradation is reached.

4. The system of claim 1, wherein increasing a value of an impairment parameter until a threshold of network performance is reached comprises increasing the value of the impairment parameter until a threshold rate of network performance degradation is reached.

5. The system of claim 1, wherein traffic generator is configured for generating both user plane test traffic and control plane test traffic for the SDN, and wherein the network impairment module is configured for applying the impairment profiles to the control plane test traffic.

6. The system of claim 1, wherein traffic generator is configured for generating both user plane test traffic and control plane test traffic for the SDN, and wherein the network impairment module is configured for applying the impairment profiles to the user plane test traffic.

7. A method for testing a software defined network (SDN), the method comprising:
  generating SDN test traffic for the SDN;
  applying a plurality of impairment profiles to the SDN test traffic;
  monitoring the SDN test traffic on the SDN; and
  mapping, for each impairment profile of the plurality of impairment profiles, the impairment profile to one or more SDN performance metric values based on monitoring the SDN test traffic in response to applying the impairment profile;
  systematically applying the impairment profiles in response to monitoring the SDN test traffic by increasing a value of an impairment parameter until determining a threshold of network performance is reached by monitoring the SDN test traffic on the SDN; and
  adjusting one or more control plane setting values for the SDN and mapping, for each adjustment of a plurality of adjustment profiles, the adjustment profile to one or more SDN performance metric values based on monitoring the SDN test traffic in response to applying the adjustment profile.

8. The method of claim 7, comprising training a machine-learning model based on mapping the impairment profiles to SDN performance metric values.

9. The method of claim 7, wherein increasing a value of an impairment parameter until a threshold of network performance is reached comprises increasing the impairment parameter until a threshold level of network performance degradation is reached.

10. The method of claim 7, wherein increasing a value of an impairment parameter until a threshold of network performance is reached comprises increasing the impairment parameter until a threshold rate of network performance degradation is reached.

11. The method of claim 7, comprising generating both user plane test traffic and control plane test traffic for the SDN and applying the impairment profiles to the control plane test traffic.

12. The method of claim 7, comprising generating both user plane test traffic and control plane test traffic for the SDN and applying the impairment profiles to the user plane test traffic.

13. A non-transitory computer readable medium comprising computer executable instructions embodied in the non-transitory computer readable medium that when executed by at least one processor of at least one computer cause the at least one computer to perform operations comprising:
  generating software defined network (SDN) test traffic for an SDN;
  applying a plurality of impairment profiles to the SDN test traffic;
  monitoring the SDN test traffic on the SDN; and
  mapping, for each impairment profile of the plurality of impairment profiles, the impairment profile to one or more SDN performance metric values based on monitoring the SDN test traffic in response to applying the impairment profile;
  systematically applying the impairment profiles in response to monitoring the SDN test traffic by increasing a value of an impairment parameter until determining a threshold of network performance is reached by monitoring the SDN test traffic on the SDN; and
  adjusting one or more control plane setting values for the SDN and mapping, for each adjustment of a plurality of adjustment profiles, the adjustment profile to one or more SDN performance metric values based on monitoring the SDN test traffic in response to applying the adjustment profile.

14. The non-transitory computer readable medium of claim 13, the operations comprising training a machine-learning model based on mapping the impairment profiles to SDN performance metric values.

15. The non-transitory computer readable medium of claim 13, wherein increasing a value of an impairment parameter until a threshold of network performance is reached comprises increasing the impairment parameter until a threshold level of network performance degradation is reached.

16. The non-transitory computer readable medium of claim 13, wherein increasing a value of an impairment parameter until a threshold of network performance is reached comprises increasing the impairment parameter until a threshold rate of network performance degradation is reached.

17. The non-transitory computer readable medium of claim 13, the operations comprising generating both user plane test traffic and control plane test traffic for the SDN and applying the impairment profiles to the control plane test traffic.

* * * * *